No. 737,615. PATENTED SEPT. 1, 1903.
C. HARPOLD.
FRUIT CUTTER.
APPLICATION FILED JUNE 8, 1903.
NO MODEL. 2 SHEETS—SHEET 2.
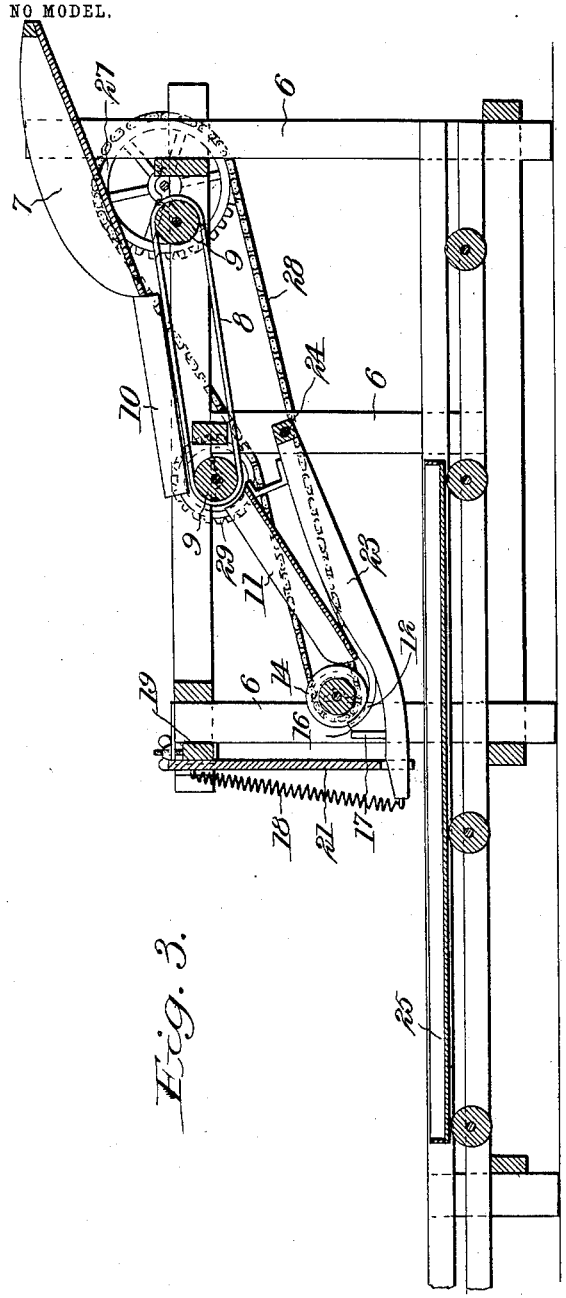
Witnesses
C. H. Walker
Geo. E. Tew
Inventor
Christopher Harpold
By Milo B. Stevens & Co
Attorneys No. 737,615. Patented September 1, 1903.

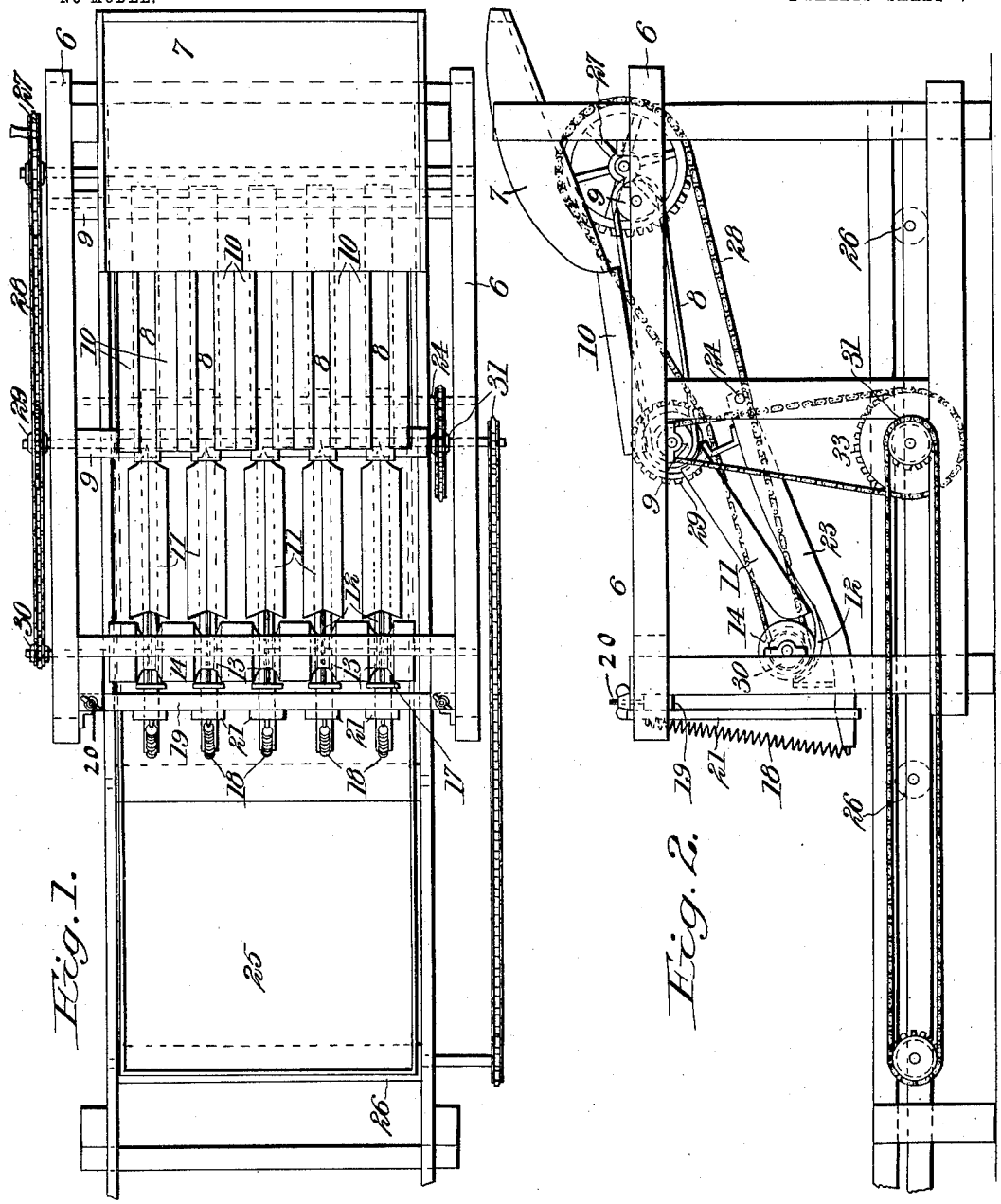

UNITED STATES PATENT OFFICE.

CHRISTOPHER HARPOLD, OF SANTA PAULA, CALIFORNIA.

FRUIT-CUTTER.

SPECIFICATION forming part of Letters Patent No. 737,615, dated September 1, 1903.

Application filed June 8, 1903. Serial No. 160,529. (No model.)

*To all whom it may concern:*

Be it known that I, CHRISTOPHER HARPOLD, a citizen of the United States, residing at Santa Paula, in the county of Ventura and State of California, have invented new and useful Improvements in Fruit-Cutters, of which the following is a specification.

This invention relates to fruit-cutters, and particularly to that class thereof adapted to halve such fruits as peaches and apricots.

The object of the invention is to produce a power-driven machine in which the fruit will be fed to a series of knives which operate to cut and split the fruit and also to incidentally remove the stones or pits from part thereof, particularly of the free-stone variety.

It embodies a series of knives in proximity to a grooved roller, and the fruit is fed between the roller and the knives and by the motion of the roller is pressed against the knives and split thereon. The effect of the motion of the roller is to rotate the fruit over the knives, and so make it cut around the same, and finally split the halves apart at the end of the knives.

In the accompanying drawings, Figure 1 is a top plan view of the machine. Fig. 2 is a side elevation. Fig. 3 is a longitudinal section. Fig. 4 is a side elevation of one of the knives and knife-holders. Fig. 5 is a section on the line 5 5 of Fig. 4. Fig. 6 is a side elevation showing one of the knives on a larger scale, and Figs. 7 and 8 are respectively sections on lines 7 7 and 8 8 of Fig. 6.

Referring now specifically to the drawings, the frame of the machine is indicated at 6 of proper shape and size to support the working parts of the machine, as hereinafter described. At the receiving or front end of the machine is a receiving-chute 7, upon which the fruit is dumped from the baskets or boxes in which it is collected. It is delivered from this chute onto a series of belt conveyers 8, which run around rollers 9. The belts are properly spaced apart and form the bottom of a series of troughs having inclined sides 10. This construction serves to arrange and convey the fruit in single file along each trough. The conveyers discharge into inclined chutes 11, each of which leads to a knife 12 and to a circumferential groove 13 in a rotating roller 14, located directly above the knife. The knives are hooked or curved and sharpened at their inner upper edges, and their curve is such that they approach closer to the roller toward their ends, so that a gradually-decreasing space is formed between the point where the fruit enters and where it leaves the knife. These knives are set in one end of swinging holders 23, the other ends of which are hinged to a rod 24, which extends through holes 15 therein. The knives are beveled to a thin sharp edge where they first take the fruit, but the bevel gradually decreases until at the end 16 thereof a rather obtuse wedge is produced. The effect of this is to first cut the fruit and, when it strikes the wedge-shaped end referred to, to split the same into halves. As explained above, the exit-point 16 of the knives is nearer to the roller 14 than the entrance of the knife. Consequently the fruit receives its greatest pressure from the roller at the end of the cut to effect the split. This result is assisted by a shield 17, comprising a small plate fixed in the holder across the end of the knife. The knives are yieldingly supported by springs 18, fastened to the free ends of the holders and to a vertically-adjustable cross-bar 19 above the same. The adjustment of the cross-bar 19 is effected by bolts 20 at the ends thereof. The cross-bar 19 also supports guides 21 for the knife-holders. These guides are attached at their upper ends to the cross-bar and at their lower ends are forked over the holders. They stop and limit the lift of the knives produced by the springs and also prevent any lateral variation of the knife-holders. By this construction the knives may be adjusted to and from the pressing-roller 14, according to the general size of the fruit being operated on, being normally set to operate on the smallest specimens thereof, and the springs permit the knives to yield to accommodate the larger specimens, so that they will not be mashed, the tension of the springs being proper for this purpose.

At 25 receiving-trays are indicated which travel at the bottom of the frame under the knives upon rollers 26. By means of suitable gearing the trays are fed along under the knives according to the speed of the machine, the object being to lay the cut fruit evenly upon the trays. A train of trays is provided, the empties being supplied at the front end of the machine.

The driving-gear consists of a main sprocket-wheel 27, driven by hand-crank or otherwise, the chain 28 of which engages a sprocket-wheel 29 on the end of the roller 9 to drive the conveyers 8 and also a sprocket-wheel 30 on the end of the shaft of the roller 14 to drive the same. The rollers 26 are driven by suitable chain-and-sprocket connection with the roller 9, as indicated at 31.

It is thought that the operation will be fully understood from the above description; but it may be summarized thus: The fruit is delivered from the chute 7 in single file along the conveyers 8 and chutes 11 between the grooves 13 and the knives 12. The direction of rotation of the roller 14 is such that the fruit is drawn in upon the knives by the rollers and turned upon the knives, giving a cut of gradually-increasing depth and final split at the ends of the knives, whence the halves drop into the trays and are carried away. It is found that in addition to splitting the fruit the pits or stones will be forced from nearly half thereof. This result, however, is incidental, the main object of the machine being to halve the fruit for drying or canning.

What I claim as new, and desire to secure by Letters Patent, is—

1. In a fruit-cutting machine, the combination with a grooved roller, of a curved knife opposite and around the groove, the beveled edge of the knife having increased obtuseness toward the end thereof.

2. In a fruit-cutting machine, the combination with a hinged spring-supported holder having a curved knife therein, the hinge being at the entrance end and the spring-support at the exit end of the knife, of a rotatable roller extending over and across the knife and having a circumferential groove opposite the knife.

3. In a fruit-cutting machine, the combination with a series of curved upwardly-presented spring-supported knives, and a roller extending across above the knives and having a circumferential groove opposite each knife, of a vertically-adjustable cross-bar above the exit ends of the knives, and stops and guides for the knives, depending from the cross-bar, to regulate their distance with respect to the roller.

In testimony whereof I have signed my name to this specification in the presence of two subscribing witnesses.

CHRISTOPHER HARPOLD.

Witnesses:
H. H. YONGHEN,
A. D. KYLE.